(12) United States Patent
Kaneko (10) Patent No.: US 8,776,959 B2
(45) Date of Patent: Jul. 15, 2014

(54) VEHICLE DISC BRAKE

(75) Inventor: Shinobu Kaneko, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 154 days.

(21) Appl. No.: 13/410,582

(22) Filed: Mar. 2, 2012

(65) Prior Publication Data

US 2012/0222925 A1   Sep. 6, 2012

(30) Foreign Application Priority Data

Mar. 2, 2011   (JP) ................. 2011-044597

(51) Int. Cl.
*F16D 65/40*  (2006.01)

(52) U.S. Cl.
USPC ................... 188/73.38; 188/73.31

(58) Field of Classification Search
USPC ........... 188/73.31, 73.36, 73.37, 73.38, 73.39
See application file for complete search history.

(56) References Cited

U.S. PATENT DOCUMENTS

| | | | | |
|---|---|---|---|---|
| 6,527,090 | B1 * | 3/2003 | Barillot et al. ............ | 188/73.38 |
| 7,644,809 | B2 * | 1/2010 | Cortinovis et al. ........ | 188/73.38 |
| 8,397,880 | B2 * | 3/2013 | Chelaidite ................. | 188/73.38 |
| 2007/0227839 | A1 * | 10/2007 | Barrett et al. ............. | 188/73.31 |
| 2010/0243385 | A1 | 9/2010 | Kaneko et al. | |
| 2011/0120821 | A1 | 5/2011 | Shimamura | |

FOREIGN PATENT DOCUMENTS

| | | |
|---|---|---|
| EP | 2299142 A1 | 3/2011 |
| JP | 2006-046597 A | 2/2006 |
| JP | 2006-336784 A | 12/2006 |
| JP | 2008286388 | 11/2008 |
| WO | WO-2010005008 A1 | 1/2010 |

OTHER PUBLICATIONS

Machine translation of JP 2008-286388 (no date).*
Extended European Search Report for Application No. 12157880.1 dated Jun. 12, 2012.
Japanese Patent Office Action for Application No. 2011-044597, drafting date—Jan. 29, 2013, 6 pages total.

* cited by examiner

*Primary Examiner* — Bradley King
*Assistant Examiner* — Nicholas J Lane
(74) *Attorney, Agent, or Firm* — Andrew M. Calderon; Roberts Mlotkowski Safran & Cole, P.C.

(57) ABSTRACT

A vehicle disc brake includes pad retainers. The pad retainer includes retainer portions disposed on torque bearing faces, pad spring-back pieces projected from radially inner sides of the retainer portions and disposed on lug piece movably supporting faces, and a connecting piece connecting radially outer sides of the retainer portions. The pad spring-back piece includes a spring-back portion extended from a base end portion thereof and inclined gradually radially inwards from the base end portion towards a distal end portion, so that the distal end portion is allowed to be brought into abutment with the lug piece movably supporting face, in such a state that the lug piece is assembled to the pad guide portion via the pad retainer and a pad abutment portion extended radially outwards from the spring-back portion to be brought into abutment with a radially inner face of the lug piece.

18 Claims, 8 Drawing Sheets

– 1 –
VEHICLE DISC BRAKE

CROSS REFERENCE TO RELATED APPLICATION(S)

The present disclosure relates to the subject matters contained in Japanese Patent Application No. 2011-044597 filed on Mar. 2, 2011, which are incorporated herein by reference in its entirety.

FIELD

One or more embodiments of the present invention relate to a vehicle disc brake for use on a vehicle such as a motor vehicle or a motorcycle, and more particularly to the construction of a pad retainer which movably supports lug pieces provided on a back plate of a friction pad by pad guide portions of caliper support arms.

BACKGROUND

In a disc brake in which lug pieces which are provided at both end portions of support or back plates of friction pads so as to project therefrom are movably supported by pad guide portions which are formed on a pair of caliper support arms so as to face each other, so that the friction pads are allowed to move in the direction of a disc axis, in general, pad retainers, which are formed of a sheet metal, are interposed individually between the pad guide portions of the pair of caliper support arms and the lug pieces of the friction pads. As such a pad guide portion, there is a pad guide portion which is formed into a stair step-like configuration by including a torque bearing face which faces a torque bearing face of an opposite pad guide portion which makes a pair therewith and a lug piece movably supporting face which project from a disc inner circumferential side or radially inner side of the torque bearing face at a right angle thereto. As a pad retainer which is to be disposed in the pad guide portions configured in the way described above, there is a pad retainer which includes a pair of retainer portions which are disposed on the torque bearing faces, a pair of pad spring-back portions which are disposed on the lug piece movably supporting faces and a connecting piece which connects the pair of retainer portions together, and a pad spring is disposed at a radially outer side to prevent the floating of the friction pad (see JP-A-2006-336784, for instance).

Additionally, as a pad guide portion, there is a pad guide portion which is formed into a U-shape in section by including a deeper side face which faces a deeper side face of an opposite pad guide portion which makes a pair therewith, a lug piece movably supporting face which projects from a disc inner circumferential or radially inner side of the deeper side face at a right angle thereto and a disc radial direction outer face which project from a disc outer circumferential or radially outer side of the deeper side face at a right angle thereto. Then, as a pad retainer which is disposed in the pad guide portions, there is a pad retainer which includes outer pieces which are disposed on the radially outer faces and pad spring-back pieces which project from the outer pieces along the lug piece movably supporting faces so as to press the lug pieces radially outwards within the pad guide portions (see JP-A-2006-46597, for instance).

In the above-described vehicle disc brakes, the pad spring-back pieces press the lug pieces of the friction pads in the directions of the radially outer faces of the pad guide portions and the pad springs. Therefore, there is no fear that the lug pieces are caused to rattle within the pad guide portions by vibrations like those which are generated when the vehicle runs normally. However, when a larger vibration than a vibration which is generated when the vehicle runs normally is imparted to the vehicle from the outside thereof as when the vehicle runs over a bump in the road, the lug pieces is caused to vibrate due to minute gaps between the lug piece movably supporting faces of the pad guide portions and the pad spring-back pieces of the pad retainers, whereby the lug pieces collide with the pad guide portions via the pad retainers, generating striking noise from time to time.

SUMMARY

An object of the embodiments is to provide a vehicle disc brake which prevents the collision of lug pieces of friction pads with pad guide portions as much as possible so as to suppress the generation of striking noise even when a larger vibration than a vibration generated when the vehicle runs normally is imparted to the vehicle from the outside thereof.

With a view to attaining the object, according to the embodiments, there is provided a vehicle disc brake including: a caliper bracket provided securely to a vehicle body, wherein the caliper bracket; a disc rotor including an outer edge; a caliper body; friction pads disposed to hold the disc rotor between the friction pads, each friction pad including a back plate; and pad retainers, wherein a pair of caliper support arms are provided on the caliper bracket so as to be extended, wherein the pair of caliper support arms straddle the outer edge of the disc rotor in a direction of a disc axis and support the caliper body, wherein a pair of pad guide portions are provided in the caliper support arms so as to face each other, wherein lug pieces are provided at both ends of the back plates of the friction pads so as to be projected, wherein the lug pieces are movably supported in the pad guide portions with the pad retainers between the lug pieces and the pad guide portions, wherein each of the pair of pad guide portions includes a torque bearing face, the torque bearing face of one of the pair of pad guide portions facing a torque bearing face of the other pad guide portion of the pair of pad guide portions, and a lug piece movably supporting face that projects from an inner side of the torque bearing face in a disc radial direction at a right angle with respect to the disc radial direction, wherein each of the pad retainers includes a pair of retainer portions which are disposed on the torque bearing faces, a pair of pad spring-back pieces which project from inner sides of the retainer portions in the disc radial direction and which are disposed on the lug piece movably supporting faces, and a connecting piece which connects outer sides of the pair of retainer portions in the disc radial direction, and wherein each of the pad spring-back pieces includes a spring-back portion which extends from a base end portion thereof which is situated at a side facing the retainer portion in a projecting direction of the lug piece movably supporting face and which is inclined gradually inwards in the disc radial direction from the base end portion towards a distal end portion, so that the distal end portion is allowed to be brought into abutment with the lug piece movably supporting face, in such a state that the lug piece is assembled to the pad guide portion with the pad retainer between the lug piece and the pad guide portion and a pad abutment portion which extends outwards in the disc radial direction from the spring-back portion so as to be brought into abutment with a disc radial direction inner face of the lug piece.

Additionally, the spring-back portion may be preferably extends from the base end portion into a planar surface. Further, an extension piece which extends inwards in the disc radial direction is preferably provided at a distal end portion of the pad abutment portion. Furthermore, the pad abutment portion and the extension piece can also be bent outwards in the disc radial direction into a crank shape from the distal end portion of the spring-back portion. In addition, the spring-back portion is preferably inclined gradually outwards in the disc radial direction from the base end portion towards the distal end portion in such a state that the pad retainer is assembled to the pad guide portions and that the lug pieces are not assembled to the pad retainer. Further, the pad guide portion may be formed into a U-shape in section by including a disc radial direction outer face which projects from an outer side of the torque bearing face in the disc radial direction at a right angle with respect to the disc radial direction so as to face the lug piece movably supporting face, and the pad retainer may include an outer piece which is disposed on the disc radial direction outer face in the disc radial direction while facing the pad spring-back piece.

According to the vehicle disc brake of the embodiments, provided on the pad spring-back piece are the spring-back portion which is inclined gradually radially inwards from the base end portion towards the distal end portion in such a state that the lug piece is assembled to the pad guide portion via the pad retainer, so that the distal end portion is allowed to be brought into abutment with the lug piece movably supporting face and the pad abutment portion which extends radially outwards from the spring-back portion so as to be brought into abutment with the disc radial direction inner face of the lug piece. In this configuration, the lug pieces are held within the pad guide portions in such a state that the gaps between the lug piece movably supporting faces and the spring-back portions are reduced or eliminated and further in such a state that the pad abutment portions movably support the disc radial direction inner faces of the lug pieces of the friction pads. Therefore, even when a larger vibration than a vibration generated when the vehicle runs normally is imparted to the vehicle from the outside thereof, the lug pieces are made difficult to collide with the pad guide portions, thereby making it possible to suppress the generation of striking noise. In addition, in such a state that the pad retainers are assembled to the pad guide portions, gaps are present between the lug piece movably supporting faces and the spring-back portions, and therefore, the lug pieces can well be assembled to the pad guide portions while deflecting the spring-back portions.

Further, the gaps between the lug piece movably supporting faces and the distal end portions of the spring-back portions are not completely eliminated in such a state that the pad retainers are pad guide portions. Thus, even in the event that the lug pieces vibrate when a larger vibration than a vibration generated when the vehicle runs normally is imparted to the vehicle from the outside thereof, only the distal end portions of the spring-back portions are brought into abutment with the lug piece movably supporting faces, but the spring-back portions are not brought into abutment with the lug piece movably supporting faces in whole, thereby making it possible to suppress striking noise to a low level. In addition, the spring-back portion is configured so that the distal end portion is brought into abutment with the lug piece movably supporting face of the pad guide portion. Therefore, the length of the spring-back portion from the proximal end to the distal end can be ensured, thereby making it possible to absorb the vibration of the lug piece by making effective use of the spring-back force thereof.

Further, the spring-back portion extends into the planar surface from the base end portion towards the open side of the pad guide portion. Therefore, only the distal end portion can be brought into abutment with the lug piece movably supporting face without providing a special configuration (a bent portion or a projecting portion) for abutment with the lug piece movably supporting face. Additionally, the extension piece is provided at the distal end portion of the pad abutment portion which extends radially inwards. Therefore, the disc radial direction inner face of the lug piece can be supported by the curved face, whereby the lug piece can be supported well, thereby making it possible to ensure the slidability of the friction pad.

Further, the pad abutment portion and the extension piece are bent radially outwards into the crank shape from the distal end portion of the spring-back portion. Therefore, the pad abutment portion and the extension piece can be formed only by providing the two bent portions on the pad spring-back piece, thereby making it possible to increase the formability of the pad retainer. Additionally, the spring-back portion is inclined gradually radially outwards from the base end portion towards the distal end portion in such a state that the pad retainer is assembled to the pad guide portion. This can bias the friction pad radially outwards, thereby making it possible to prevent the looseness of the friction pad.

Furthermore, the pad guide portion is formed into the U-shape by including the disc radial direction outer face which projects from the radially outer side of the torque bearing face at a right angle thereto and which faces the lug piece movably supporting face, and the pad retainer includes the outer piece which is disposed on the disc radial direction outer face while facing the pad spring-back piece. Therefore, the lug piece can be held reliably within the pad guide portion. Additionally, the lug pieces are held within the pad guide portions in such a state that the gaps between the lug piece movably supporting faces and the spring-back portions are reduced or eliminated and further in such a state that the pad abutment portions movably support the disc radial direction inner faces of the lug pieces of the friction pads. Therefore, even when a larger vibration than a vibration generated when the vehicle runs normally is imparted to the vehicle from the outside thereof, the collision between the lug pieces and the lug piece movably supporting faces and the disc radial direction outer faces of the pad guide portions is suppressed, thereby making it possible to suppress the generation of striking noise.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Figure 1:
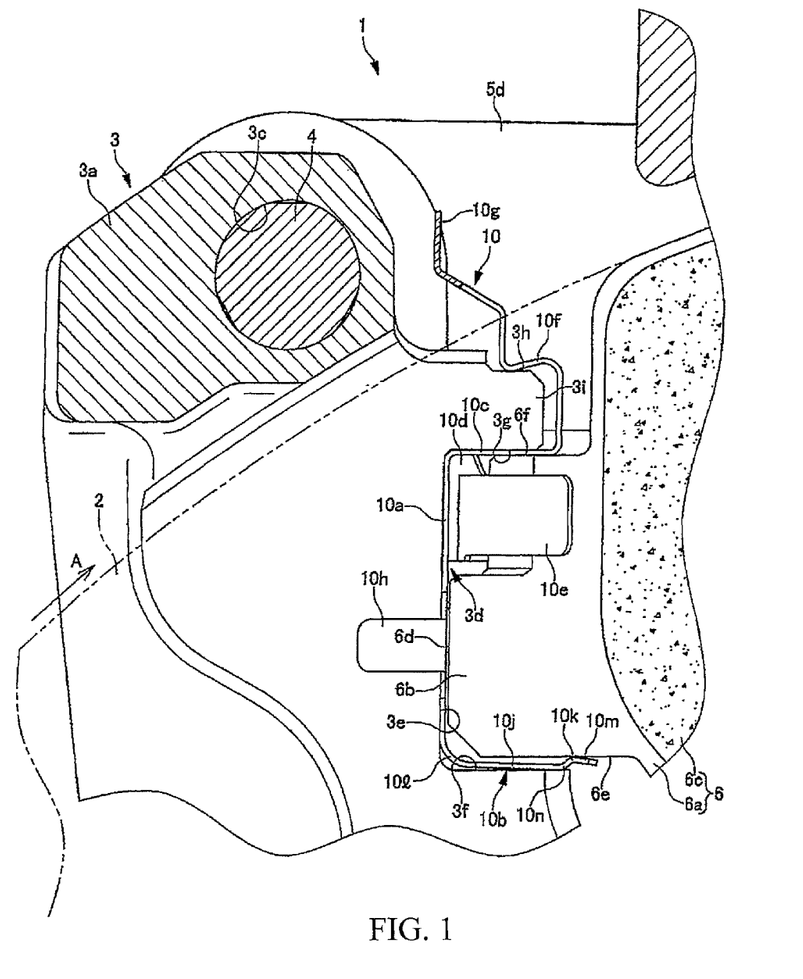
FIG. 1 is an enlarged sectional view of a main part of a vehicle disc brake showing a first embodiment of the invention.
Figure 2:
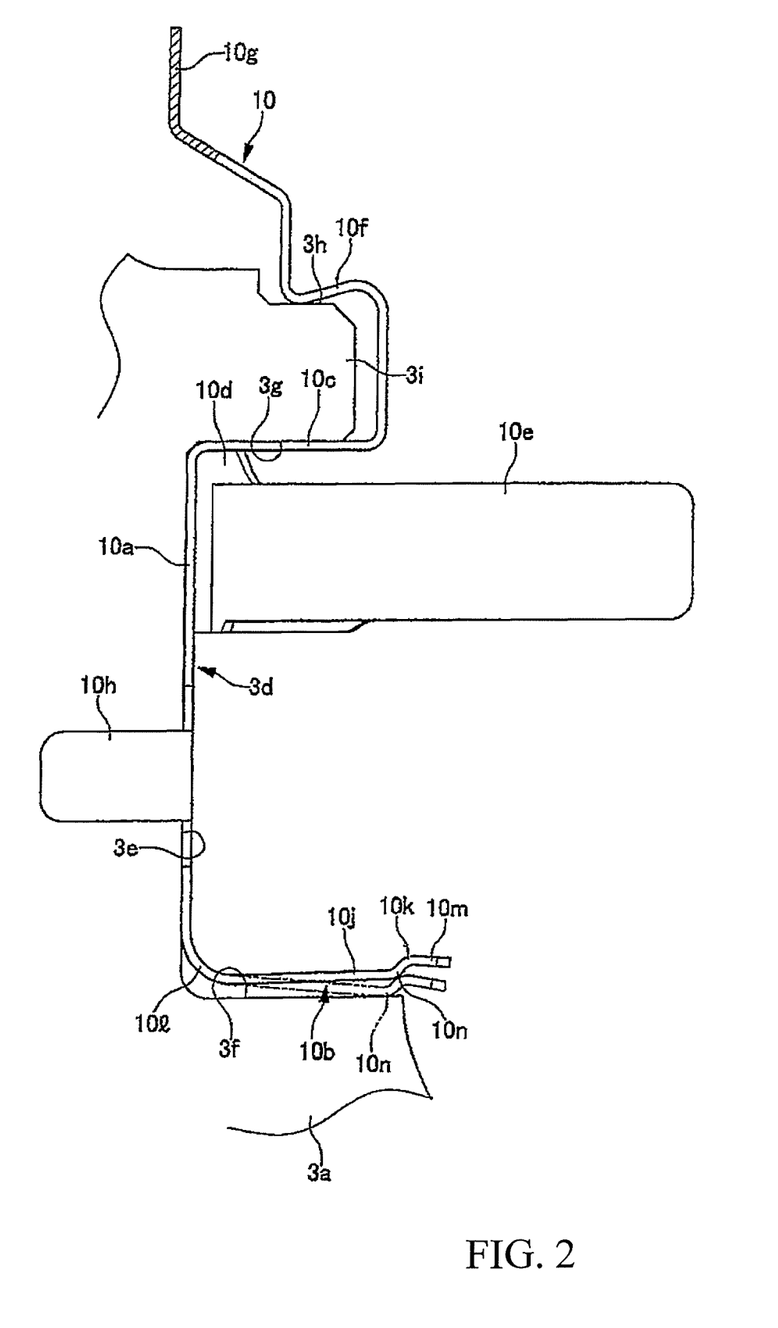
FIG. 2 is an explanatory diagram of a state in which a pad retainer is mounted in a pad guide portion of the vehicle disc brake of the first embodiment.
Figure 3:
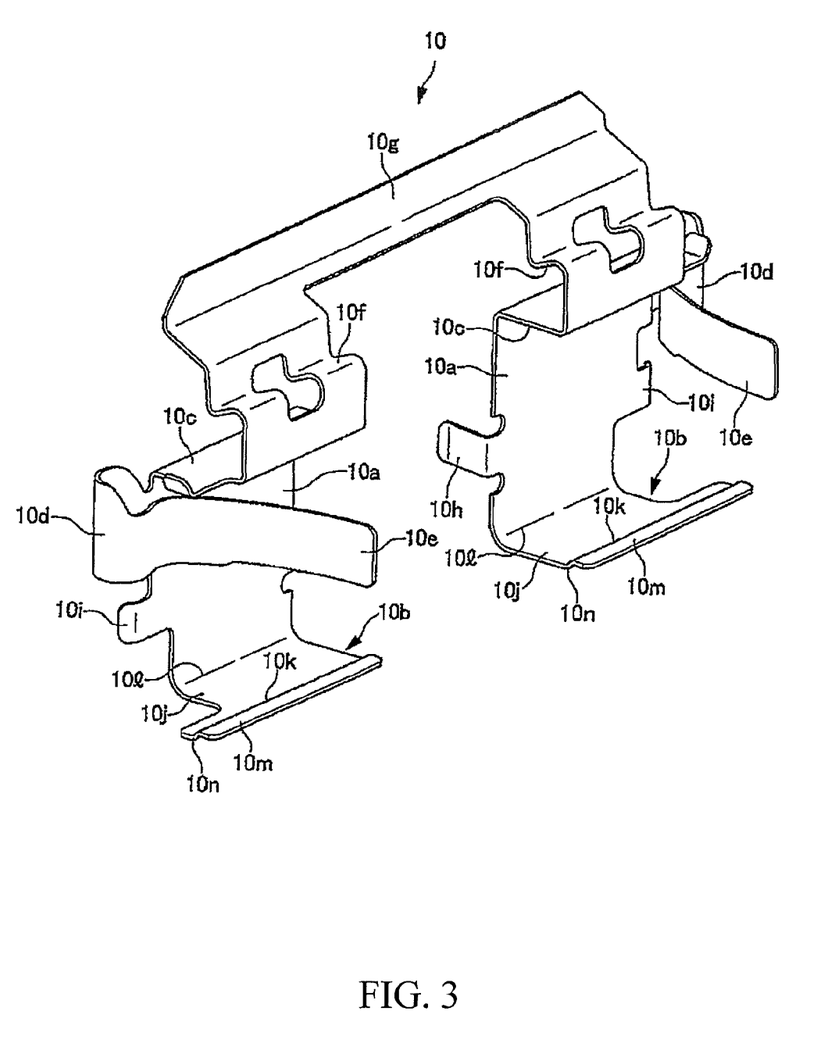
FIG. 3 is a perspective view of the pad retainer.
Figure 4:
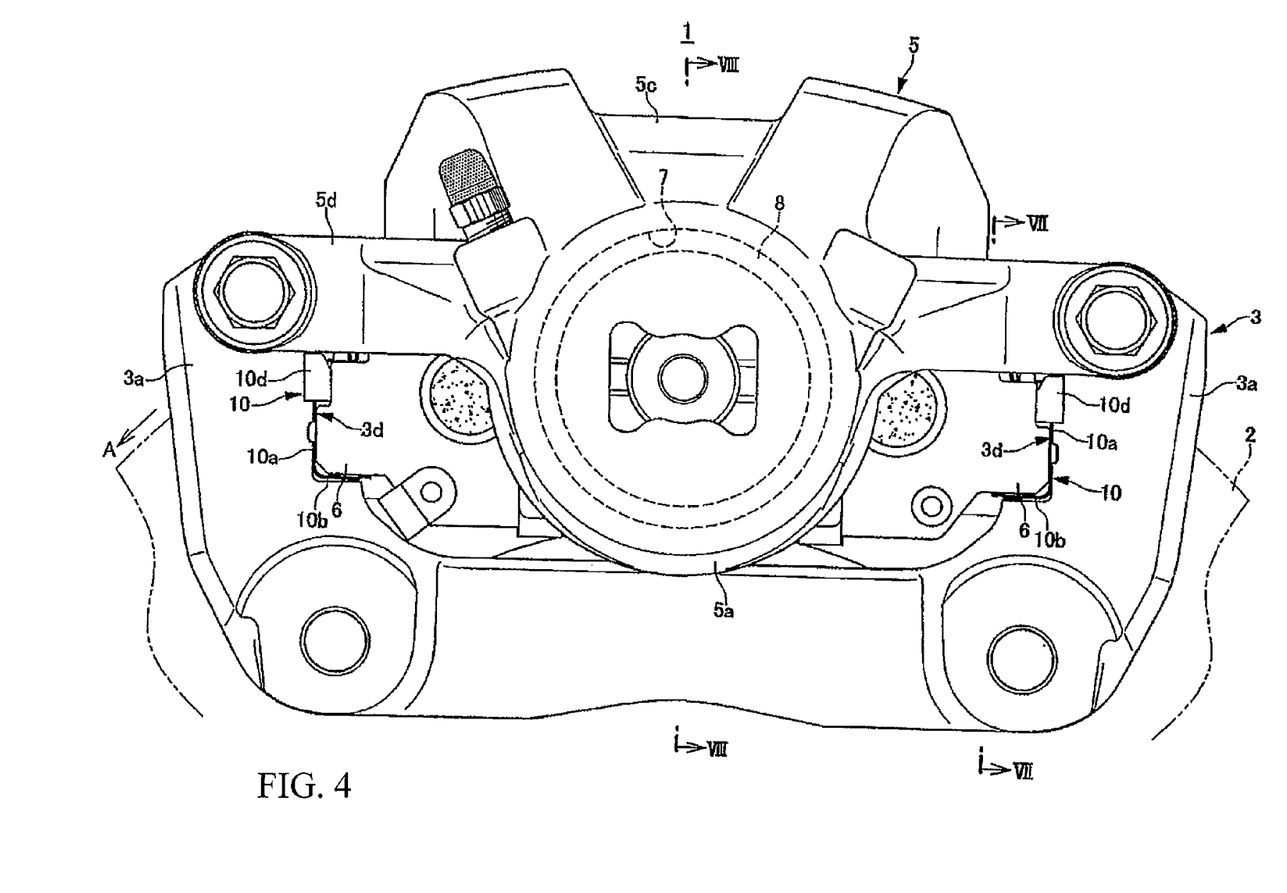
FIG. 4 is a front view of the vehicle disc brake.
Figure 5:
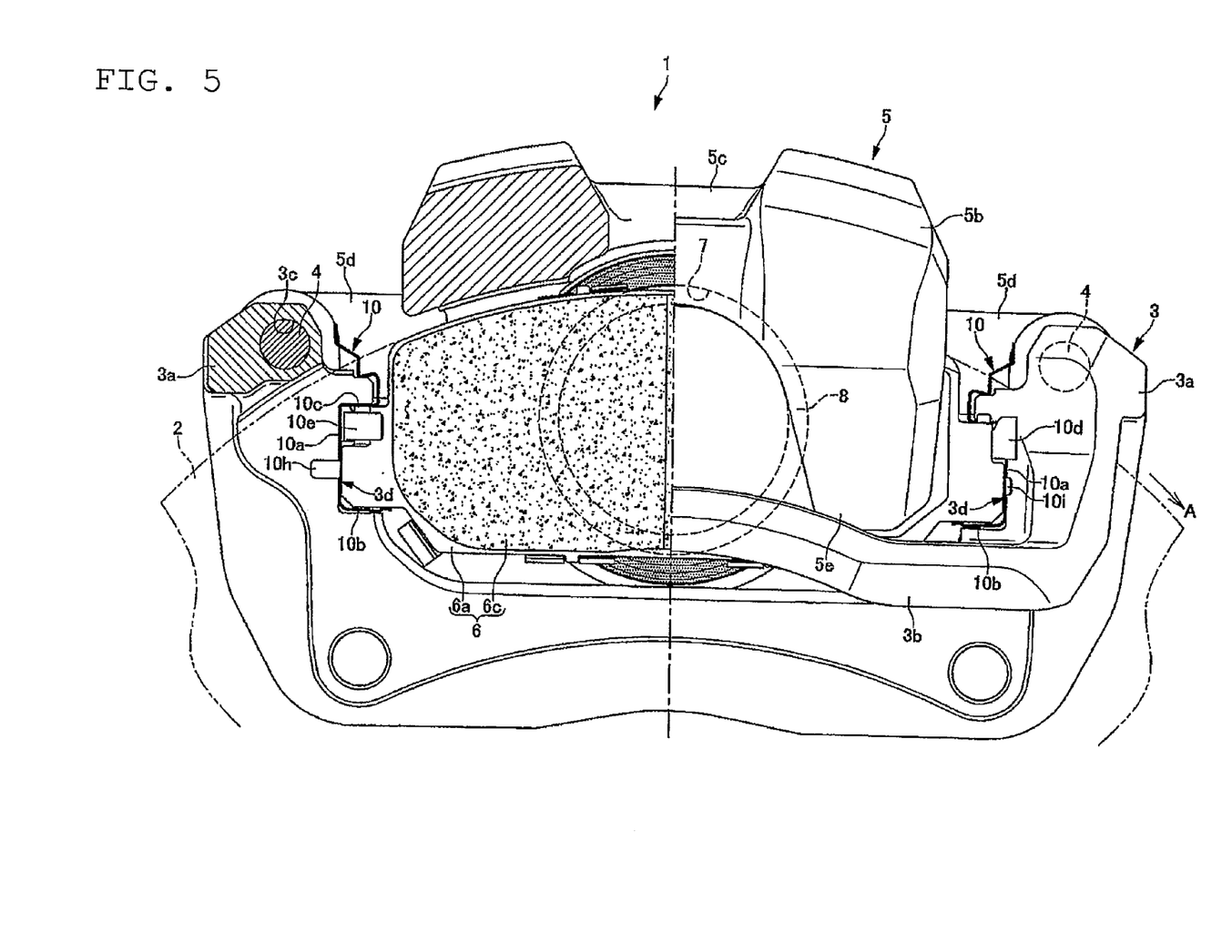
FIG. 5 is a partially sectioned rear view of the vehicle disc brake.
Figure 6:
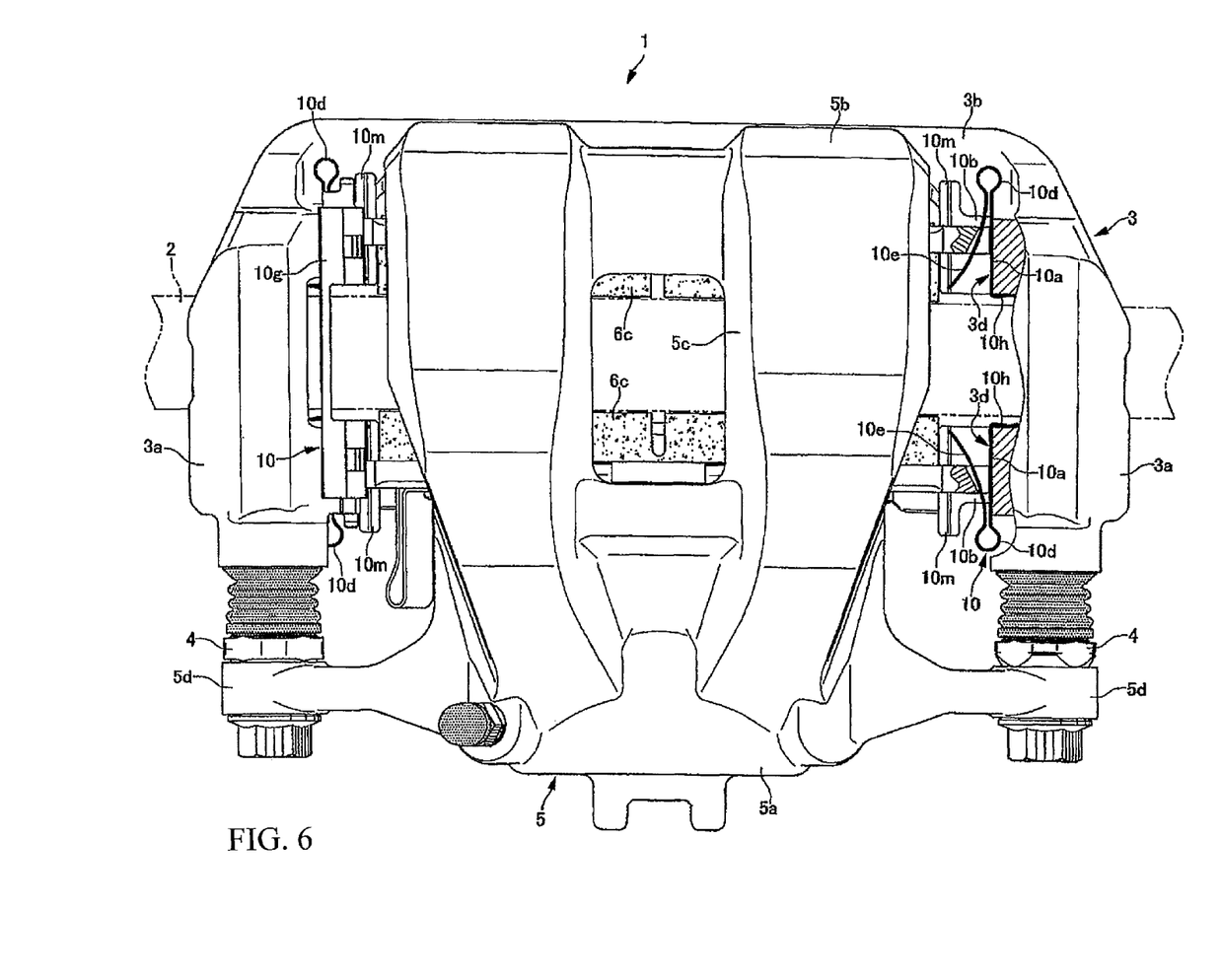
FIG. 6 is a plan view of the vehicle disc brake.
Figure 7:
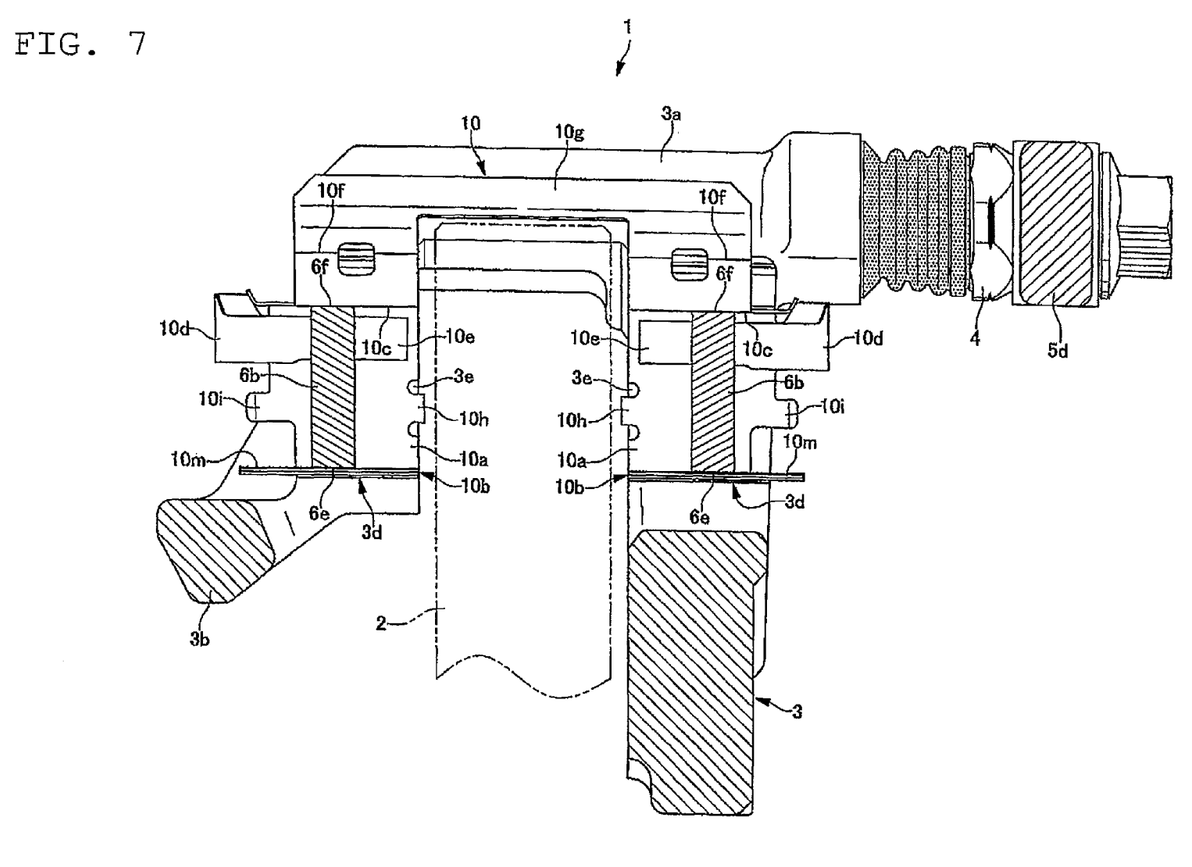
FIG. 7 is a sectional view taken along the line VII-VII in FIG. 4.
Figure 8:
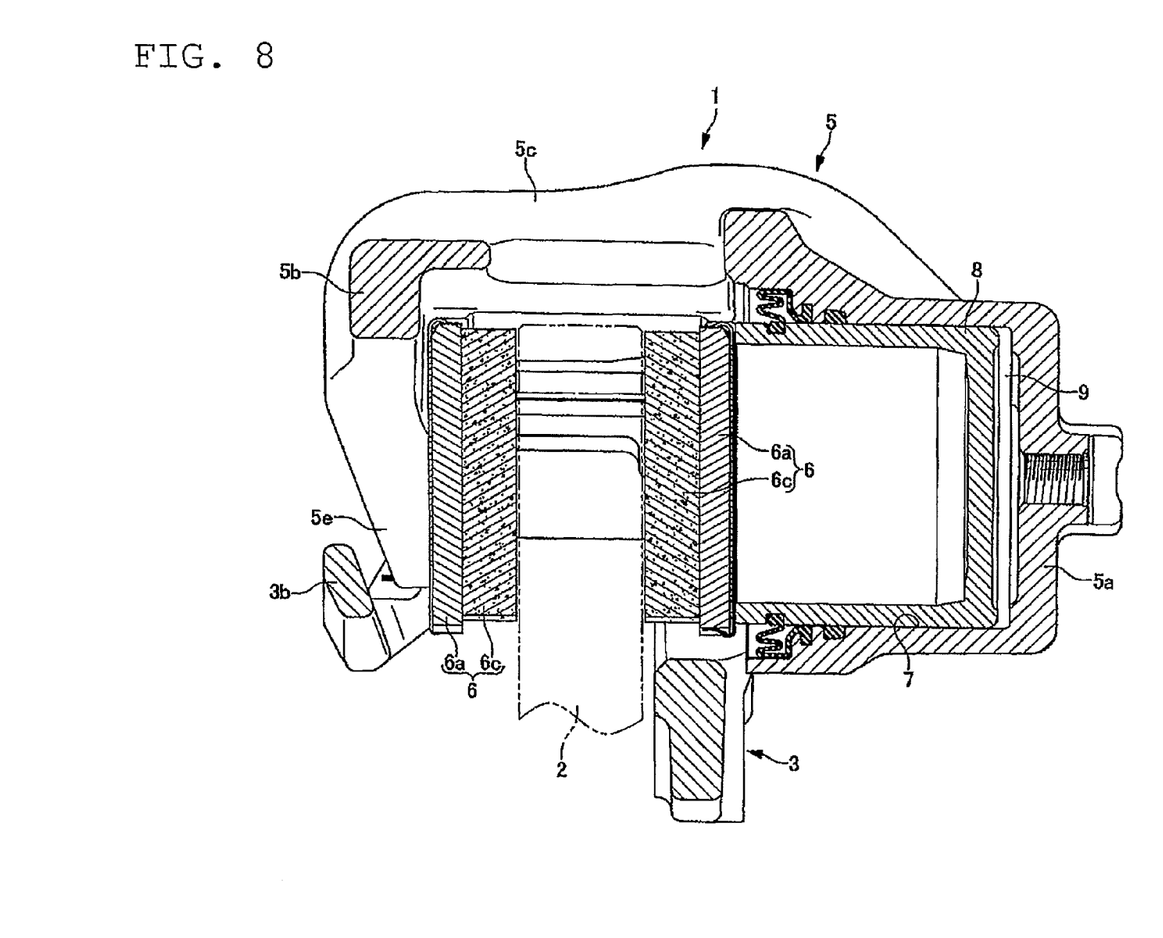
FIG. 8 is a sectional view taken along the line in FIG. 4.

FIGS. 1 to 8 are the drawings showing one embodiment of a vehicle disc brake of the invention. An arrow A indicates a rotating direction of a disc rotor which rotates together with a front wheel when a vehicle travels forwards. When referred to in the following description, a disc rotation output side and a disc rotation input side are those when the vehicle travels forwards.

This vehicle disc brake includes a disc rotor 2 which rotates together with a wheel, a caliper bracket 3 which is provided securely to a vehicle body at one side portion of the disc rotor 2, a caliper body 5 which is supported on caliper support arms 3a, 3a of the caliper bracket 3 via a pair of slide pins 4, 4 so as to move in the direction of a disc axis, and a pair of friction pads 6, 6 which are disposed inside an acting portion 5a and a reacting portion 5b of the caliper body 5, respectively, so as to face each other across the disc rotor 2.

The caliper body 5 includes the acting portion 5a and the reacting portion 5b which are disposed on both sides of the disc rotor 2 and a bridge portion 5c which straddles an outer edge of the disc rotor 2 to connect the acting portion 5a and the reacting portion 5b together. A cylinder bore 7 is provided in the acting portion 5a, and this cylinder bore 7 is opened to a side of the acting portion 5a which faces the disc rotor 2. A bottomed cylindrical piston 8 is accommodated in the cylinder bore 7. The piston 8 is made to move in the direction of the disc rotor 2 in the cylinder bore 7 by virtue of a fluid under pressure which is supplied to a hydraulic chamber 9 in a bottom portion of the cylinder bore 7. Additionally, vehicle body mounting arms 5d, 5d are provided at side portions of the acting portion 5a so as to project sideways therefrom. The slide pin 4 projects from a distal end of each vehicle body mounting arm 5d in the form of a mounting bolt.

The caliper support arms 3a, 3a extend from both side portions of the caliper bracket 3 to straddle the outer edge of the disc rotor 2 in the direction of the disc axis while holding both sides of the bridge portion 5c therebetween and further extend in the direction of a disc center along a side wall of the reacting portion 5b on the other side portion of the disc rotor. Distal ends of the caliper support arms 3a, 3a are connected together by a tie rod 3b so as to increase the rigidity of both the support arms 3a, 3a to which braking torque is applied.

In each caliper support arm 3a, a guide hole 3c is opened for accommodation of the slide pin 4, and on both the caliper support arms 3a, 3a, four pad guide portions 3d in total are provided so that two pad guide portions 3d are situated on either side of the disc rotor 2 so as to face each other across the disc rotor 2. Each of the pair of pad guide portions 3d which face each other on one side of the disc rotor 2 has a U-shaped cross section which is formed by a torque bearing face 3e which faces a torque bearing face 3e of the other opposite pad guide portion 3d, a lug piece movably supporting face 3f which projects from a disc radial direction or simply radially inner side of the torque bearing face 3e at a right angle thereto and a radially outer face (disc radial direction outer face) 3g which projects from a radially outer side of the torque bearing face 3e at a right angle thereto and which faces the lug piece movably supporting face 3f. Additionally, pad retainer mounting portions 3i, 3i are provided at radially outer sides of the pad guide portions 3d, 3d, and the pad retainer mounting portions 3i, 3i each have a mounting face 3h which is parallel to the radially outer face 3g.

In each friction pad 6, lug pieces 6b, 6b are provided at both end portions of a support or back plate 6a so as to project sideways therefrom, and a lining 6c is affixed to one side face of the back plate 6a. The lug pieces 6b, 6b are each formed into a stair step-like shape in which a projecting length of a radially outer side of each of disc rotating direction outer faces 6d, 6d becomes shorter than a projecting length of a radially inner side thereof. The lug pieces 6b, 6b of the friction pads 6, 6 are then supported movably in the disc rotation input side and output side pad guide portions 3d, 3d via corresponding pad retainers 10.

The pad retainer 10 includes a pair of retainer portions 10a, 10a which are mounted in the pad guide portions 3d, 3d situated on both the sides of the disc rotor 2 at a disc rotation input side or a disc rotation input side, a pair of pad spring-back pieces 10b, 10b which project from radially inner sides of the retainer portions 10a, 10, respectively, to thereby be disposed on the lug piece movably supporting faces 3f, 3f, outer pieces 10c, 10c which project from radially outer sides of the retainer portions 10a, 10a so as to face the pad spring-back pieces 10c, 10c and which are disposed on the radially outer faces 3g, 3g, pad returning portions 10e, 10e which extend towards the disc rotor 2 via elastic loop portions 10d, 10d which are provided on sides of the retainer portions 10a, 10a which are opposite to disc rotor sides thereof which face the disc rotor 2, mounting pieces 10f, 10f which are brought into abutment with the mounting faces 3h of the pad retainer mounting portions 3i, 3i of the caliper support arm 3a, and a connecting piece 10g which straddles the outer edge of the disc rotor 2 so as to connect upper portions of the mounting pieces 10f, 10f together. In addition, retainer support pieces 10h, 10h are provided on the disc rotor sides of the retainer portions 10a, 10a so as to project therefrom to be brought into abutment with a disc rotor side face of the caliper support arm 3a, while on the sides of the retainer portions 10a, 10a which are opposite to the disc rotor sides thereof, insertion guide pieces 10i, 10i are provided so as to project therefrom to be brought into abutment with a face of the caliper support arm 3a which is opposite to the disc rotor side face thereof.

Each pad spring-back piece 10b includes a spring-back portion 10j which extends towards an open side of the pad guide portion 3d from a base end portion 10l which is situated at a side facing the retainer portion 10a, a pad abutment portion 10k which extends radially outwards from the spring-back portion 10j so as to be brought into abutment with a radially inner face (disc radial direction inner face) 6e of the lug piece 6b, and an extension piece 10m which extends radially inwards from the pad abutment portion 10k. The spring-back portion 10j extends into a planar surface from the base end portion 10l towards the open side of the pad guide portion. The pad abutment portion 10k and the extension piece 10m are bent radially outwards into a crank shape from a distal end portion 10n of the spring-back portion 10j. Additionally, in such a state that the pad retainer 10 is assembled to the pad guide portion 3d but the lug piece 6b is not assembled to the pad retainer 10, the spring-back portion 10j is inclined gradually radially outwards from the base end portion 10l towards the distal end portion 10n as indicated by solid lines in FIG. 2, defining a gap between the spring-back portion 10j and the lug piece movably supporting surface 3f. On the other hand, in such a state that the lug piece 6b is assembled into the pad guide portion 3d via the pad retainer 10, the spring-back portion 10j is inclined gradually radially inwards from the base end portion 10l towards the distal end portion 10n as indicated by imaginary lines, and the distal end portion 10n of the spring-back portion 10j is brought into abutment with the lug piece movably supporting face 3f.

Each elastic loop portion 10d is formed by bending back a thin elongated piece which extends from the radially outer side of the retainer portion 10a to the side thereof which is opposite to the disc rotor side in an arc-like shape. The pad returning portion 10e is formed by inclining a distal end portion of the thin elongated piece which extends further in the direction of the disc rotor 2 from a bent-back end of the elastic loop portion 10d towards in a direction opposite to the retainer portion and warping it in a curved shape along the extending direction. This pad returning portion 10e has a length which is long enough to match a distance over which the lining 6c moves from it is new until it is worn up.

In each outer piece 10c, a distal end portion is bent back along a distal end face of the pad retainer mounting portion 3i and is then caused to extend in the direction of a radially outer face of the pad retainer mounting portion 3i, so that the mounting piece 10f is formed so as to be elastically deformable. Then, the mounting piece 10f which is elastically deformed so as to extend outwards is brought into abutment with the mounting face 3h, so that the pad retainer portion 3i is held by the mounting piece 10f and the outer piece 10c therebetween.

The pad retainer 10 which is formed in the way described heretofore is mounted on the caliper support arm 3a by holding the pad retainer mounting portions 3i by the mounting pieces 10f, 10f and the outer pieces 10c, 10c. The outer piece 10c of each pad retainer portion 10a is brought into abutment with the radially outer face 3g of each pad guide portion 3d, whereby the pad spring-back piece 10b is inclined gradually radially outwards from the proximal end side towards the distal end side and is disposed on the lug piece movably supporting face 3f via the gap, the retainer portion 10a being thereby disposed along the torque bearing face 3e.

Each friction pad 6 is mounted by inserting the lug pieces 6b, 6b of the back plate 6a into the disc input side and output side pad guide portions 3d, 3d from a side opposite to a disc rotor side thereof. When the lug pieces 6b, 6b are inserted into a predetermined position in the pad guide portions 3d, 3d, the distal end portions 10n of the spring-back portions 10j are brought into abutment with the lug piece movably supporting faces 3f, and the pad abutment portions 10k are brought into abutment with the radially inner faces 6e of the lug pieces 6, the lug pieces 6b being then biased radially outwards by the corresponding spring-back portions 10j. Further, the radially outer portions of the disc rotating direction outer faces 6d of the lug pieces 6b are brought into abutment with the pad returning portions 10e, whereby the lug pieces 6b are biased towards the open sides and the sides opposite to the sides facing the disc rotor 2 of the pad guide portions 3d.

The embodiment is configured in the way that has been described heretofore. In this configuration, when a pressurized working fluid is supplied into the hydraulic chamber 9 as a result of a braking operation carried out by the driver, the piston 8 travels forwards in the cylinder bore 7 to press against one side face of the disc rotor 2 which rotates in the direction indicated by the arrow A. Following this, the caliper body 5 travels in the direction of the acting portion 5a while being guided by the slide pins 4, 4 by virtue of a reaction force generated then, and reacting claws 5e press the friction pad 6 in the reacting portion 5b against the other side face of the disc rotor 2.

As this occurs, the lug pieces 6b, 6b of each friction pad 6 move smoothly in the corresponding pad guide portions 3d, 3d with the radially outer faces 6f guided by the outer pieces 10c, 10c of the retainer portions 10a, 10a and the radially inner faces 6e, 6e of the lug pieces 6b, 6b supported by the pad abutment portions 10k, 10k in such a state that the radially outer faces 6f of the lug pieces 6b, 6b pressed against the radially outer faces 3g of the pad guide portions 3d. As this occurs, since the extension pieces 10m are provided at the distal end portions of the pad abutment portions 10k, the radially inner faces 6e, 6e of the lug pieces 6b, 6b can be supported by the curved surfaces, which enables the lug pieces 6b, 6b to be supported well, whereby the sliding performance of the friction pads 6, 6 can be ensured. This prevents the loosening of the lug pieces 6b, 6b within the pad guide portions 3d, 3d, whereby the lug pieces 6b, 6b are allowed to slide well in the pad guide portions 3d, 3d, thereby making it possible to suppress striking noise that would otherwise be produced by the loosening of each friction pad 6.

Additionally, in the event that the lug pieces 6b, 6b vibrate as a result of a larger vibration than a vibration given to the vehicle when the vehicle runs normally being given to the vehicle from the outside thereof as when the vehicle runs over a bump in the road, the distal end portions 10n of the spring-back portions 10j of the pad spring-back pieces 10b are brought into abutment with the lug pieces movably supporting faces 3f. Therefore, striking noise can be suppressed to a low level. Further, in the spring-back portion 10j, the distal end portion 10n is brought into abutment with the lug piece movably supporting face 3f of the pad guide portion 3d, and therefore, the length of the spring-back portion 10j from the base end portion 10l to the distal end portion 10n thereof can be ensured, whereby the vibration of the lug piece can be absorbed by making effective use of the spring-back force thereof. In addition, the gap between the lug piece movably supporting face 3f and the distal end portion 10n of the spring-back portion 10j is not eliminated completely in such a state that the lug piece 6b is assembled to the pad guide portion 3d via the pad retainer 10. Thus, even when the lug piece 6 vibrates, only the distal end portion 10n of the spring-back portion 10j is brought into abutment with the lug piece movably supporting face 3f, and the whole of the spring-back portion 10j is never brought into abutment with the lug piece movably supporting face 3f, thereby making it possible to suppress striking noise to a low level.

Additionally, the spring-back portion 10j extends from the base end portion 10l to the open side of the pad guide portion 3d in a straight line in section, whereby only the distal end portion 10n can be brought into abutment with the lug piece movably supporting face 3f well without providing any special configuration to bring the distal end portion 10n into abutment with the lug piece movably supporting face 3f. Further, the pad abutment portion 10k and the extension piece 10m are bent radially outwards into the crank shape from the distal end portion 10n of the spring-back portion 10j, whereby the pad abutment portion 10k and the extension piece 10m can be formed easily.

On the other hand, when the brakes are released to allow the piston 8 and the reacting claws 5e to retreat to the positions where they had been before the brakes were applied, the elastic loop portions 10d, 10d and the pad returning portions 10e, 10e attempt to return to their initial shapes. Therefore, the lug pieces 6b, 6b which are in abutment with the pad returning portions 10e, 10e are pressed in the opposite direction to the disc rotor 2, so that the respective friction pads 6 are forced to move away from the side faces of the disc rotor 2, whereby the dragging of the friction pads 6 can be prevented.

The invention is not limited to the embodiment that has been described heretofore, and hence, the invention can also be applied to the type of vehicle disc brake described in JP-A-2006-336784 in which the lug pieces of the friction pads are movably supported in the stair step-like pad guide portions which each include the torque bearing face and the lug piece movably supporting face and the pad springs are disposed on the radially outer sides of the lug pieces. In addition, the configurations and locations of the mounting piece, the outer piece, the pad returning piece, the guide piece, the retainer support piece and the extension piece of the pad retainer are arbitrary, and further, they can also be omitted. Additionally, in the embodiment, the disc rotating direction end face of the lug piece is formed in the stair step-like shape.

However, the invention is not limited thereto, and hence, the disc rotating direction end face of the lug piece may be formed into a planar surface.

What is claimed is:

1. A vehicle disc brake comprising:
a caliper bracket provided securely to a vehicle body;
a disc rotor comprising an outer edge;
a caliper body;
friction pads disposed to hold the disc rotor between the friction pads, each friction pad comprising a back plate; and
pad retainers,
wherein the caliper bracket includes a pair of caliper support arms,
wherein the pair of caliper support arms straddle the outer edge of the disc rotor in a direction of a disc axis and support the caliper body,
wherein pad guide portions are provided in the caliper support arms,
wherein lug pieces are provided at both ends of the back plate of each friction pad,
wherein the pad guide portions are configured to support the lug pieces with the pad retainers being disposed between the lug pieces and the pad guide portions,
wherein each of the pad guide portions comprises
a torque bearing face, and
a lug piece movably supporting face that projects from a disc-radial-direction inner side of the torque bearing face in a direction substantially perpendicular to the torque bearing face,
wherein the torque bearing face of one of the pad guide portions faces a torque bearing face of another one of the pad guide portions,
wherein each of the pad retainers comprises
a pair of retainer portions which are disposed on the torque bearing faces,
a pair of pad spring-back pieces which project from disc-radial-direction inner sides of the retainer portions and which are configured to be disposed on the lug piece movably supporting faces,
a pair of outer pieces which project from disc-radial-direction outer sides of the retainer portions, and
a connecting piece which connects the disc-radial-direction outer sides of the pair of retainer portions of each pad retainer, and
wherein each of the pad spring-back pieces comprises:
a spring-back portion which includes a base end portion and a distal end portion and extends from the base end portion in a direction along which the lug piece movably supporting face projects, the base end portion being located on a retainer portion side of the spring back portion; and
a pad abutment portion which is configured to extend outwards in the disc radial direction from the spring-back portion so as to be brought into abutment with a disc-radial-direction inner face of the lug piece,
wherein each spring-back portion is inclined gradually inwards in the disc radial direction from the base end portion towards the distal end portion so that the distal end portion is in abutment with the lug piece movably supporting face when the lug piece is assembled to the pad guide portion with the pad retainer being disposed between the lug piece and the pad guide portion, and
wherein each spring-back portion is inclined gradually outwards in the disc radial direction from the base end portion towards the distal end portion when the pad retainer is assembled to the pad guide portion so that the retainer portion is disposed on the torque bearing face from the base end portion of the spring-back portion to the outer piece and when the lug piece is not assembled to the pad retainer.

2. The vehicle disc brake of claim 1,
wherein each spring-back portion includes a planar surface extending from the base end portion.

3. The vehicle disc brake of claim 1,
wherein each pad spring-back piece includes an extension piece, which extends inwards in the disc radial direction, at a distal end portion of the pad abutment portion.

4. The vehicle disc brake of claim 3,
wherein the pad abutment portion and the extension piece of each pad spring-back piece are bent outwards in the disc radial direction into a crank shape from the distal end portion of the spring-back portion.

5. The vehicle disc brake of claim 1,
wherein each pad guide portion comprises a disc-radial-direction outer face which projects from an disc-radial-direction outer side of the torque bearing face in a direction substantially perpendicular to the torque bearing face so as to face the lug piece movably supporting face,
wherein each pad guide portion is formed into a U-shape in section, and
wherein the outer pieces are disposed on the disc-radial-direction outer faces and face the pad spring-back pieces.

6. The vehicle disc brake of claim 5, wherein each caliper support arms comprises a pad retaining mounting portion including the disc-radial-direction outer face.

7. The vehicle disc brake of claim 6, wherein each pad retainer includes mounting pieces which are brought into abutment with mounting faces of the pad retainer mounting portions of the caliper support arm.

8. The vehicle disc brake of claim 7, wherein each pad retainer includes pad returning portions extending towards the disc rotor.

9. The vehicle disc brake of claim 8, wherein each pad retainer includes elastic loop portions which are provided on sides of the retainer portions.

10. The vehicle disc brake of claim 9, wherein each elastic loop portion is a bent back elongated piece which extends from disc-radial-direction outer side of the retainer portion.

11. The vehicle disc brake of claim 10, wherein each elastic loop portion is formed in an arc-like shape.

12. The vehicle disc brake of claim 9, further comprising insertion guide pieces which extend outwards from the retainer portions and which are brought into abutment with a face of the caliper support arm opposite to a side face of the disc rotor.

13. The vehicle disc brake of claim 12, further comprising retainer support pieces provided on disc rotor sides of the retainer portions, wherein the retainer support pieces extend from the retainer portions on an opposite side to the insertion guide pieces.

14. The vehicle disc brake of claim 13, wherein each pad spring-back piece includes an extension piece which extends radially inwards from the pad abutment portion.

15. The vehicle disc brake of claim 14, wherein the pad abutment portion and the extension piece of each pad spring-back piece are bent radially outwards into a crank shape from the distal end portion of the spring-back portion.

16. The vehicle disc brake of claim 7, wherein the mounting pieces are elastically deformable.

17. The vehicle disc brake of claim 16,
wherein the pad retainers are mounted on the caliper support arms by holding the pad retainer mounting portions by the mounting pieces and the outer pieces.

18. The vehicle disc brake of claim 1, wherein a gap is formed between the distal end portion of each spring-back portion and the lug piece movably supporting face when the pad retainer is assembled to the pad guide portion and when the lug piece is not assembled to the pad retainer.

* * * * *